US008401857B2

(12) United States Patent
Miyamoto et al.

(10) Patent No.: US 8,401,857 B2
(45) Date of Patent: Mar. 19, 2013

(54) ASSISTING APPARATUS GENERATING TASK-COMPLETED DATA WHILE KEEPING SOME ORIGINAL DATA SECRET FROM THE OPERATOR IN CHARGE OF THE TASK

(75) Inventors: Kohtaroh Miyamoto, Kanagawa (JP); Hiroaki Ozeki, Kanagawa-ken (JP); Takashi Saitoh, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 12/709,642

(22) Filed: Feb. 22, 2010

(65) Prior Publication Data

US 2010/0214476 A1 Aug. 26, 2010

(30) Foreign Application Priority Data

Feb. 24, 2009 (JP) .................................. 2009-41464

(51) Int. Cl.
*G10L 15/00* (2006.01)
*G10L 21/00* (2006.01)
(52) U.S. Cl. .................... 704/270; 704/251; 704/273
(58) Field of Classification Search ........................ None
See application file for complete search history.

(56) References Cited

U.S. PATENT DOCUMENTS

| 5,960,080 | A  | * | 9/1999  | Fahlman et al. ............. 380/252 |
| 5,960,447 | A  | * | 9/1999  | Holt et al. .................... 715/201 |
| 6,678,822 | B1 | * | 1/2004  | Morar et al. ................. 713/182 |
| 7,103,915 | B2 | * | 9/2006  | Redlich et al. ................. 726/27 |
| 7,293,175 | B2 | * | 11/2007 | Brown et al. ................. 713/166 |
| 7,512,791 | B1 | * | 3/2009  | Sato ............................. 713/166 |
| 7,801,720 | B2 | * | 9/2010  | Satake et al. ...................... 704/4 |
| 7,934,160 | B2 | * | 4/2011  | Bono et al. .................... 715/732 |
| 8,078,595 | B2 | * | 12/2011 | King et al. .................... 707/694 |
| 2003/0140106 | A1 | * | 7/2003 | Raguseo ....................... 709/207 |

(Continued)

FOREIGN PATENT DOCUMENTS

JP 2006-244315 A 9/2006
JP 2008040587 A 2/2008

(Continued)

OTHER PUBLICATIONS

H. Kikuchi et. al., "A Study on a Method for Semantic Analysis of Utterance based on Verb," Proceedings (2) of 65th(2003) National Convention, Artificial Intelligence and Cognitive Science, Mar. 25, 2003, pp. 2-397-2-398—(Partial translation of OA (attached).

(Continued)

*Primary Examiner* — Talivaldis Ivars Smits
(74) *Attorney, Agent, or Firm* — Scully, Scott, Murphy & Presser, P.C.; Eustus D. Nelson, Esq.

(57) ABSTRACT

Assisting apparatus that assists in a task for generating task-completed data from original data. The assisting apparatus includes: a conversion unit that converts the original data into converted data in order to keep a content of the original data secret from an operator in charge of the task; an interface unit that provides the converted data to the operator, and thereby allows the operator to perform the task by using the converted data and thus to generate a task-completed version of the converted data; and an inverse conversion unit that generates the task-completed data by performing inverse conversion of the task-completed version of the converted data.

13 Claims, 9 Drawing Sheets

U.S. PATENT DOCUMENTS

| | | | |
|---|---|---|---|
| 2006/0014546 A1* | 1/2006 | Bodin et al. | 455/456.1 |
| 2006/0026000 A1* | 2/2006 | Bodin et al. | 704/270.1 |
| 2007/0244700 A1* | 10/2007 | Kahn et al. | 704/235 |
| 2008/0262841 A1* | 10/2008 | Miyamoto et al. | 704/251 |

FOREIGN PATENT DOCUMENTS

| | | |
|---|---|---|
| JP | 2008096842 A | 4/2008 |

OTHER PUBLICATIONS

Kotaro Miyamoto, Hybrid Subtitle Editing . .Fusion, Institute of Electronics Information Communication Engineer Journal, Japan, Mar. 1, 2007, vol. J90-D), No. 3, p. 673-682.

* cited by examiner

230

| WORD/PHRASE | RISK INDEX | PROCESSING TIME LIMIT | RISK MEASURES |
|---|---|---|---|
| W1 | HIGH | 3 HOURS | SECURE SUBTITLE PROCESSING PER NEWS (SECURITY DEGREE: HIGH) |
| W2 | HIGH | 2 HOURS | SECURE SUBTITLE PROCESSING PER SENTENCE (SECURITY DEGREE: HIGH) |
| W3 | MEDIUM | 30 MINUTES | SECURE SUBTITLE PROCESSING PER WORD (SECURITY DEGREE: MEDIUM) |
| WC1, WC2 | HIGH | 2 HOURS | SECURE SUBTITLE PROCESSING PER NEWS (SECURITY DEGREE: HIGH) |
| WC3, WC4, WC5 | HIGH | 1 HOUR | SECURE SUBTITLE PROCESSING PER SENTENCE (SECURITY DEGREE: HIGH) |
| WC6, WC7 | MEDIUM | 45 MINUTES | SECURE SUBTITLE PROCESSING PER WORD (SECURITY DEGREE: MEDIUM) |
| ... | ... | ... | ... |

| OPERATOR ID | HIGHEST RISK INDEX |
|---|---|
| A | HIGH |
| B | MEDIUM |
| C | HIGH |
| ⋮ | ⋮ |

FIG. 4

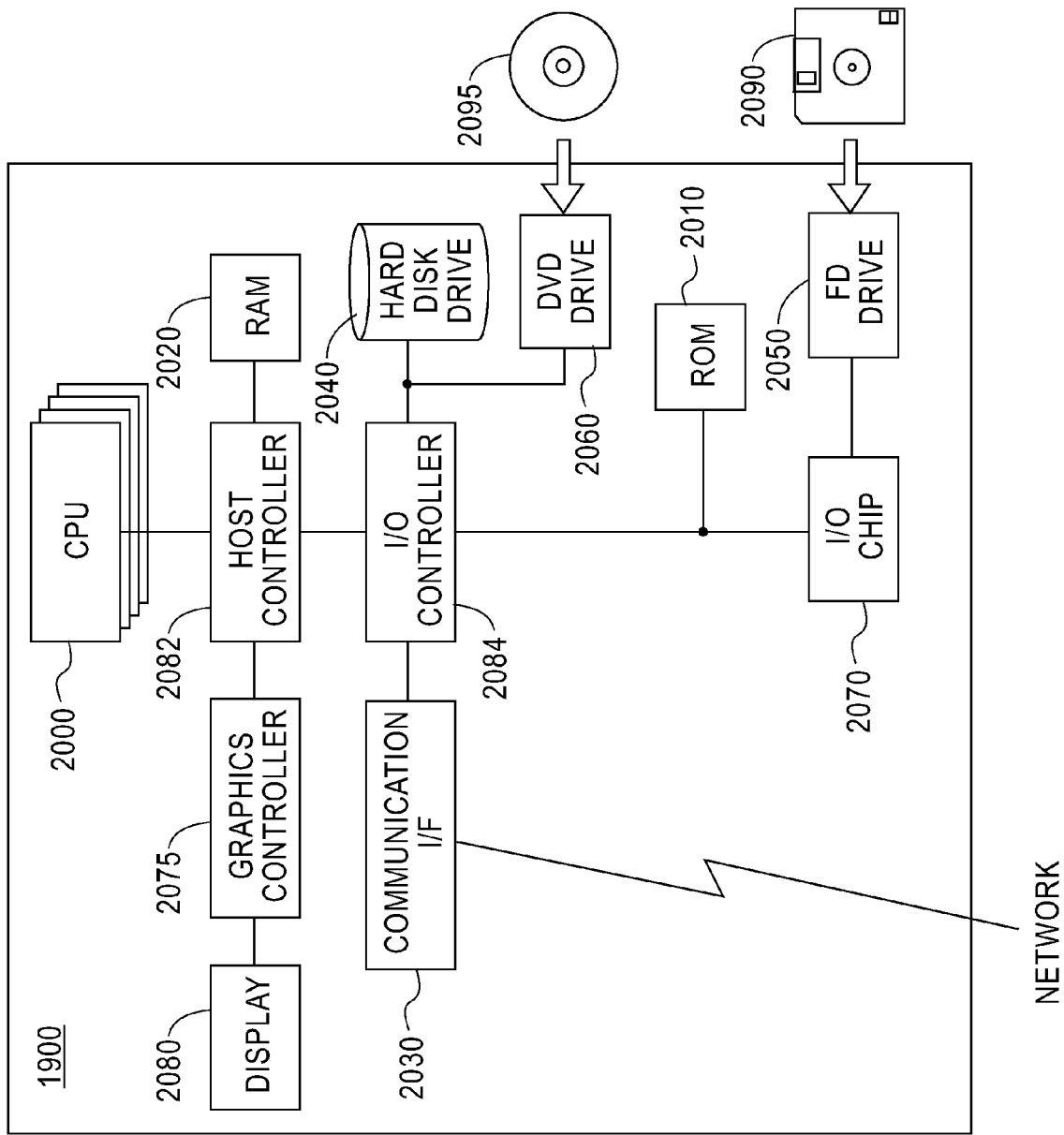

ASSISTING APPARATUS GENERATING TASK-COMPLETED DATA WHILE KEEPING SOME ORIGINAL DATA SECRET FROM THE OPERATOR IN CHARGE OF THE TASK

CROSS REFERENCE TO RELATED APPLICATION

This application claims priority under 35 U.S.C. 119 from Japanese Patent Application 2009-41464, filed Feb. 24, 2009, the entire contents of which are incorporated herein by reference.

BACKGROUND OF THE INVENTION

1. Field of the Invention

The present invention relates to an assisting apparatus, an assisting program and an assisting method.

2. Description of Related Art

Heretofore, some moving images with voice of programs such as news and movies have been broadcasted or screened with subtitles. To make this possible, a subtitle editor needs to watch and add subtitles to moving images with voice before the broadcast or the like of the moving images.

News broadcasts and the like may include some content that needs to be kept secret until they are broadcasted. However, when a conventional method is employed, a subtitle editor would know the content of news or the like before they are broadcasted.

For example, assume that the broadcast of scandal news of a company is scheduled after a related stock exchange is closed. In such a case, a subtitle editor may start adding subtitles to the news clip before the stock exchange is closed. Accordingly, the subtitle editor would know the content of the news while the stock exchange is still open, and thus be in a position to abuse the content of the news.

In another example, assume that a subtitle editor adds subtitles to a film yet to be released. In such a case, the subtitle editor would know the story and the ending of the film before the release of the film, and thus be in a position to leak the story or the ending of the film before the release.

SUMMARY OF THE INVENTION

In accordance with one aspect of the present invention, an assisting apparatus that assists in a task for generating task-completed data from original data includes: a conversion unit that converts the original data into converted data in order to keep a content of the original data secret from an operator in charge of the task; an interface unit that provides the converted data to the operator, and thereby allows the operator to perform the task by using the converted data and thus to generate a task-completed version of the converted data; and an inverse conversion unit that generates the task-completed data by performing inverse conversion of the task-completed version of the converted data In accordance with a second aspect of the present invention, the assisting apparatus includes: a word/phrase storage unit that stores, in association with each of a plurality of words/phrases, presentation timing at which the word/phrase is allowed to be presented to an operator; and an interface unit that presents a section of the original data including any of the words/phrases stored in the word/phrase storage unit, to the operator at timing satisfying the presentation timing corresponding to the word/phrase, and thereby allows the operator to perform the task on the section in the original data.

In accordance with another aspect of the present invention, computer program is provided on or in a storage medium. When the program executed, it will cause a computer to function as an assisting apparatus for assisting in a task for generating task-completed data from original data.

In accordance with a further aspect of the present invention, assisting apparatus for assisting in a task for generating, from original data of a moving image with audio including an image and audio, task-completed data including a transcribed text added to the moving image with audio, includes: a speech recognition unit that generates a speech recognition text by recognizing audio of the original data; a conversion unit that converts the original data and the speech recognition text of the original data into converted data and a speech recognition text of the converted data in order to keep a content of the original data secret from an operator in charge of the task; an equalization unit that equalizes at least one of pitch, strength and utterance speed of audio of the converted data generated by the conversion unit; an interface unit that provides the converted data and the speech recognition text of the converted data to the operator, and thereby allows the operator to edit the speech recognition text of the converted data and thus to generate a task-completed version of the converted data including a transcribed text corresponding to the audio; and an inverse conversion unit that generates the task-completed data by performing inverse conversion of the task-completed version of the converted data.

The conversion unit generates the converted data and the speech recognition text of the converted data by inserting audio of a different proper noun and a text of a different proper noun into at least one section of the audio of the original data and at least one section of the speech recognition text of the original data, respectively, and also by rearranging sections of each of the original data and the speech recognition text of the original data, and the inverse conversion unit generates the task-completed data by arranging sections of the task-completed version of the converted data back to the original order and also by removing the sections corresponding to the different audio and text from the task-completed version of the converted data.

In accordance with yet another aspect of the present invention, a method for assisting in a task for generating task-completed data from original data, the assisting method includes the steps of: converting the original data into converted data in order to keep a content of the original data secret from an operator in charge of the task; providing the converted data to the operator, to allow the operator to perform the task by using the converted data and thus to generate a task-completed version of the converted data; and generating the task-completed data by performing inverse conversion of the task-completed version of the converted data.

BRIEF DESCRIPTION OF THE DRAWINGS

For a more complete understanding of the present invention and the advantages thereof, reference is now made to the following description taken in conjunction with the accompanying drawings.

FIG. 3 shows an example of the content of a word/phrase storage unit 230 according to the embodiment of the present invention.

FIG. 4 shows an example of the content of an operator information storage unit 260 according to the embodiment of the present invention.

FIG. 9 shows an example of a hardware configuration of a computer 1900 according to the embodiment of the present invention.

DETAILED DESCRIPTION OF THE PREFERRED EMBODIMENT

The present invention is described below on the basis of an embodiment of the present invention. However, the embodiment is not intended to limit the invention according to the scope of the claims. In addition, not all the combinations of the features described in the embodiment are necessarily essential for the solving means of the invention.

Figure 1:
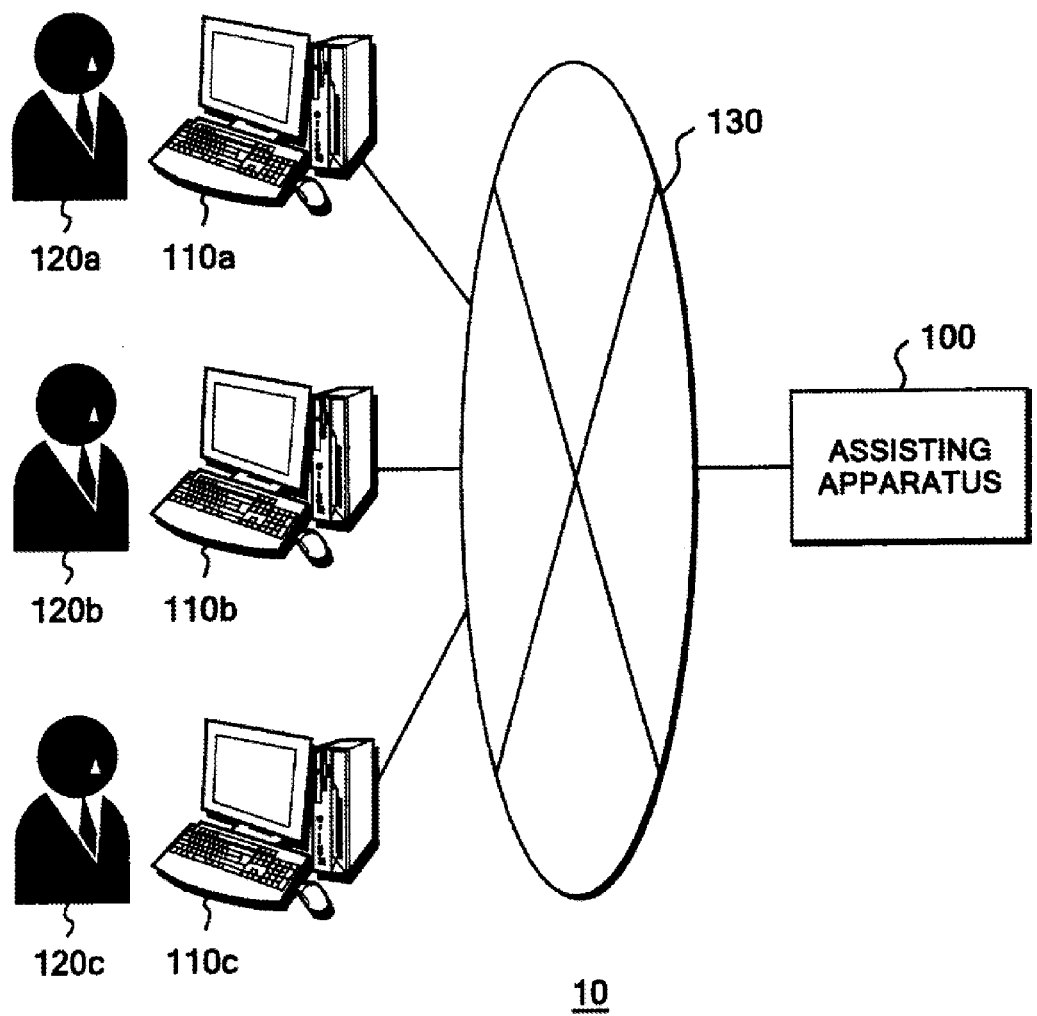
FIG. 1 shows a configuration of an assisting system 10 according to an embodiment of the present invention.

FIG. 1 shows a configuration of an assisting system 10 according to this embodiment. In a case where one or multiple operators 120 perform a task such as adding subtitles to moving images of news with voice, for example, the assisting system 10 allows the one or multiple operators 120 to perform the subtitle editing task while keeping the content of the news secret from the one or multiple operators 120.

The assisting system 10 includes: an assisting apparatus 100; one or multiple terminals 110a to 110c used respectively by the one or multiple operators 120a to 120c; and a network 130. The assisting apparatus 100 assists in a task for generating, from original data such as moving images with voice, task-completed data such as the moving images with voice including subtitles added thereto. Although description will be given in this embodiment by taking a task of adding subtitles to moving images with voice as an example, the assisting system 10 may assist in various tasks by allowing an operator to generate task-completed data with reference to original data.

Examples of such tasks in which the assisting system 10 may assist are: a task for adding voice such as explanation or translation voice, to voice, a still image, moving images or moving images with voice; and a task for adding a sign language video to voice, a still image, moving images or moving images with voice. In addition, the assisting system 10 may also assist in: a task for generating task-completed data with text by translating original data with text; a task for generating a task-completed data with a voice by reading aloud original data with text; and the like.

Each of the terminals 110a to 110c (collectively called terminals 110, below) is used to allow the corresponding one of the operators 120a to 120c (collectively called operators 120, below) to perform the task for generating task-completed data from original data while receiving assistance by the assisting apparatus 100. Each of the terminals 110 receives and transmits information from and to the corresponding operator 120. The network 130 connects the one or multiple terminals 110 to the assisting apparatus 100. Examples of the network 130 include the wired and/or wireless Internet, an intranet, a local area network, and the like.

Figure 2:
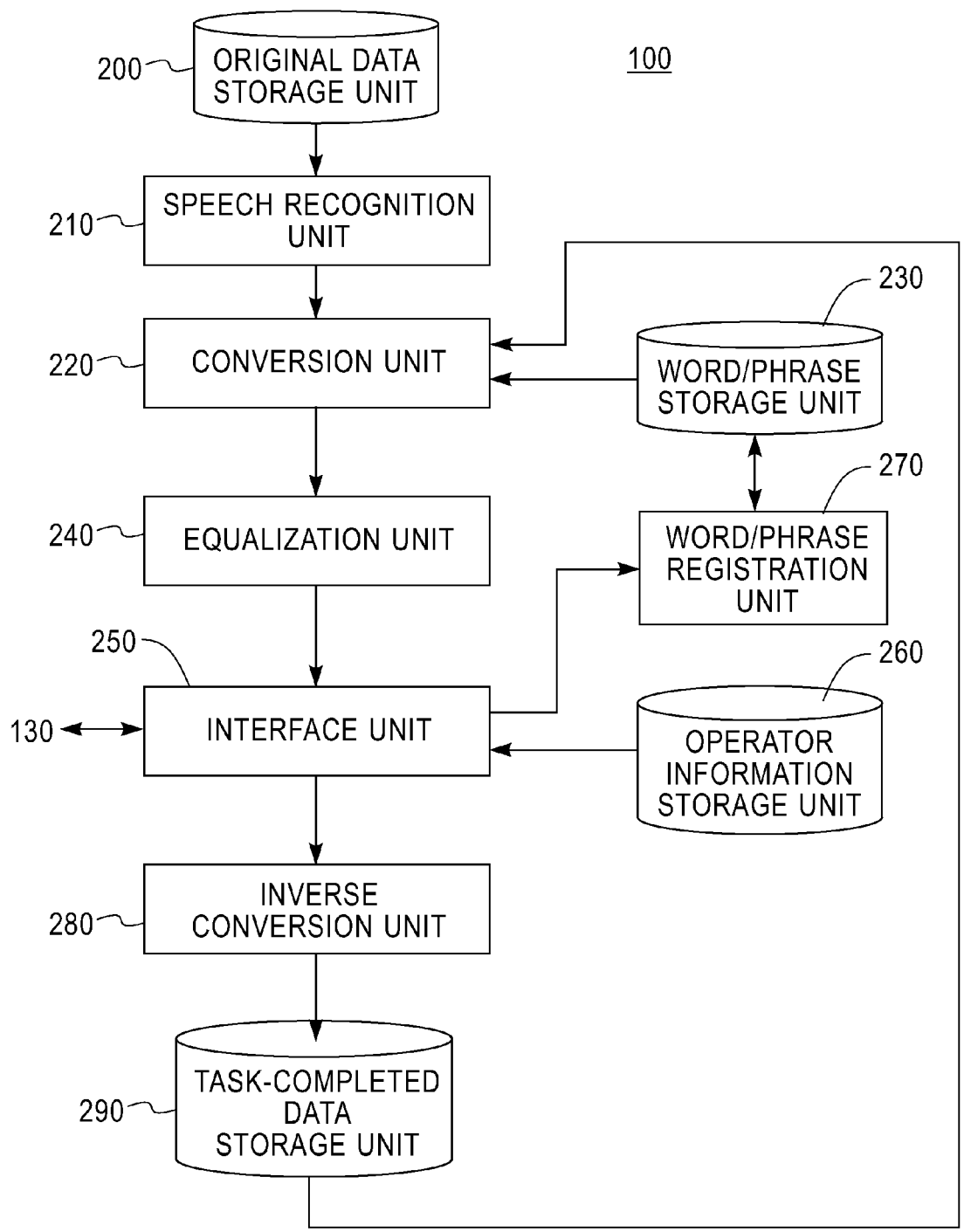
FIG. 2 shows a configuration of an assisting apparatus 100 according to the embodiment of the present invention.

FIG. 2 shows a configuration of the assisting apparatus 100 according to this embodiment. The assisting apparatus 100 includes an original data storage unit 200, a speech recognition unit 210, a conversion unit 220, a word/phrase storage unit 230, an equalization unit 240, an interface unit 250, an operator information storage unit 260, a word/phrase registration unit 270, an inverse conversion unit 280 and a task-completed data storage unit 290. The original data storage unit 200 stores data on moving images with voice as an example of original data, which is data before a task is performed thereon. The speech recognition unit 210 recognizes the voice of the original data, and then generates a speech recognition text. Since a conventional technique provides a method of generating a speech recognition text by recognizing a voice, description of such a method is omitted here.

The conversion unit 220 converts the original data into converted data in order to keep the content of the original data secret from the operators 120a to 120c. In this embodiment, the conversion unit 220 converts the original data including images and voice of the moving images with voice, into converted data. Moreover, the conversion unit 220 converts the speech recognition text of the original data into a speech recognition text of the converted data.

Specifically, the conversion unit 220 sections each of the moving images with voice, the voice and the speech recognition text of the original data by a predetermined unit such as for each topic, sentence and/or word/phrase of the news or the like, and judges, for each section, whether or not any of the words that are stored in the word/phrase storage unit 230 and should be kept secret is included. Then, the conversion unit 220 performs, on each section including a word/phrase to be kept secret, at least one of processing for disguising content (simply called content disguise processing) and processing for making content incomplete (simply called content incompletion processing) to be described below, in order to keep the content secret from the operator.

(1) Content Disguise Processing

The conversion unit 220 inserts a different voice or a different text into at least one corresponding section of each of the voice and the speech recognition text of the original data, more preferably, corresponding sections sufficient for keeping the content of the original data secret, and thereby generates converted data and a speech recognition text of the converted data. In this way, the conversion unit 220 keeps the content of the original data secret by preventing the operators from recognizing a section of the converted data that matches each corresponding section of the original data.

(2) Content Incompletion Processing

The conversion unit 220 rearranges sections of each of the original data and the speech recognition text of the original data similarly, and thereby generates converted data and a speech recognition text of the converted data. In this way, the conversion unit 220 can generate converted data in which multiple items of news, multiple sentences, multiple words/phrases or the like are rearranged and mixed, or the like, to make it difficult for the operators to grasp the content of the original data by arranging the sections back to the original order.

The word/phrase storage unit 230 stores, for each of multiple words/phrases: the secret degree of the word/phrase (for example, whether or not the word/phrase should be kept secret from the operators 120a to 120c and/or the degree at which the word/phrase should be kept secret); and the presentation timing at which the word/phrase is allowed to be presented to the operators 120a to 120c. The equalization unit 240 performs processing for making a speaker anonymous (simply called speaker anonymizing processing, below) to be described later on the converted data and the speech recognition text of the converted data outputted by the conversion unit 220, and thereby keeps the content secret from the operators.

(3) Speaker Anonymizing Processing

The equalization unit 240 equalizes at least one of the pitch, the strength or the speech speed of the voice of the converted data generated by the conversion unit 220. Thereby, the equalization unit 240 makes it difficult to distinguish speakers of the respective sections of the converted data generated by inserting dummy voices or the like by the content disguise processing, and/or the converted data generated by rearranging the sections by the content incompletion processing. Consequently, the conversion unit 220 prevents the operators from being capable of extracting voice sections of a particular speaker, to keep the content secret from the operators.

The interface unit 250 provides the converted data to the one or multiple operators 120 through the one or multiple networks 130, and allows the one or multiple operators to perform a task on the basis of the converted data and thereby generate task-completed converted data. In the case of assisting in a task for adding subtitles to news or the like, the interface unit 250 provides the converted data to the operators 120, and allows the operators 120 to generate task-completed converted data including a subtitle text corresponding to the voice of the converted data on the basis of the converted data. Here, the task performed by the operators 120 may cause at least a part of the converted data to be included in the task-completed converted data, as in the case of editing the text of converted data to generate task-completed converted data, for example. Alternatively, the task performed by the operators 120 may be for generating task-completed converted data that is completely different from the converted data, that is, task-completed data of the converted data, as in the case of generating a new translation text on the basis of the text of the converted data, for example.

The operator information storage unit 260 stores, for each of the multiple operators 120, the highest secret degree of the words/phrases that are allowed to be presented to the operator 120. When finding a new word/phrase to be kept secret as a result of the task performed by the operators, the word/phrase registration unit 270 registers the word/phrase in the word/phrase storage unit 230.

The inverse conversion unit 280 generates task-completed data by performing inverse conversion on the task-completed converted data. In the case of assisting in a task for adding subtitles to news or the like, the inverse conversion unit 280 performs inverse conversion on the task-completed converted data, and thereby generates task-completed data including a subtitle text added to the moving images with voice. Here, if the task-completed converted data has been generated through the content disguise processing, the inverse conversion unit 280 generates task-completed data by removing sections corresponding to the different voice and text from the task-completed converted data. Moreover, if the task-completed converted data has been generated through the content incompletion processing, the inverse conversion unit 280 generates task-completed data by arranging the sections of the task-completed converted data back to the original order.

The task-completed data storage unit 290 stores task-completed data outputted by the inverse conversion unit 280. The stored task-completed data is to be broadcasted, screened or the like later. The conversion unit 220 may use the task-completed data already stored in the inverse conversion unit 280, as a different voice and/or text to be inserted into original data in the content disguise processing to be performed later.

By using the above-described assisting apparatus 100, task-completed data can be generated by: converting original data into converted data by performing at least one of the content disguise processing, the content incompletion processing and the speaker anonymizing processing on the original data; allowing the operators to perform a task on the converted data; and then performing inverse conversion after the task. In this way, the assisting apparatus 100 is capable of keeping the content of the original data secret from the operators.

In the case of assisting in a task for generating task-completed data with voice or text from original data with voice or text, the conversion unit 220 converts the original data with voice or text into converted data with voice or text. Then, the inverse conversion unit 280 performs inverse conversion on the task-completed converted data with voice or text, and thereby generates task-completed data with voice or text. In the case of assisting in a task for generating task-completed data with text from original data with voice, the conversion unit 220 converts the original data with voice into the converted data with voice. Then, the interface unit 250 provides the converted data to the operators 120 to allow the operators 120 to generate a text of the task-completed converted data on the basis of the voice of the converted data. Thereafter, the inverse conversion unit 280 performs inverse conversion on the task-completed converted data, and thereby generates task-completed data with text.

FIG. 3 shows an example of the content in the word/phrase storage unit 230 according to this embodiment. The word/phrase storage unit 230 stores, in association with one or multiple words/phrases: a "risk index" indicating whether or not the one or multiple words/phrases should be kept secret from the operators and/or the secret degree of the one or multiple words/phrases; "time limit for processing" indicating a presentation timing at which the one or multiple words/phrases are allowed to be presented to the operators; and "risk measures" indicating processing to be performed on each section including the one or any of the multiple words/phrases.

For example, in FIG. 3, a word/phrase W1 included in original data is conditioned on a risk index of "high." Moreover, the word/phrase W1 is conditioned on such a limitation that the word/phrase W1 should not be provided to the operators more than three hours before the broadcast of the corresponding news since the time limit for processing for the word/phrase W1 is three hours. Furthermore, the word/phrase W1 is conditioned on that "secure subtitle processing per item of news" should be performed at a security degree of "high."

For example, in FIG. 3, the combination of words/phrases WC3, WC4 and WC5 included in the original data is conditioned on a risk index of "high." Moreover, the time limit for processing for the combination is one hour. Furthermore, the section including any of the words/phrases WC3, WC4 and WC5 is conditioned on that "secure information processing per sentence" should be performed at a security degree of "high."

Each word/phrase to be registered in the word/phrase storage unit 230 is a word/phrase which may cause a negative effect of harming a third party due to a misuse of the word/phrase if a topic, sentence, clause and/or the like including the word/phrase becomes public before official broadcast, release or the like. As examples of such a word/phrase, conceivable are: a word/phrase that can be insider information of a company such as "information leakage," "factory fire," or "illegal trade;" personal information such as "name," "address," "telephone number," "e-mail address"; and the like.

As an example of presentation timing, the word/phrase storage unit 230 stores time limit for processing that shows how many minutes/hours before the broadcasting a corresponding word/phrase is allowed to be presented to the operators 120, by using broadcast time as a standard. As another example of presentation timing, the word/phrase storage unit 230 may store time limit for processing that shows a time period in which the corresponding word/phrase registered in the word/phrase storage unit 230 is not allowed to be presented to the operators 120, by using, as a standard, the date and time of generation of the original data or the date and time of writing the original data in the original data storage unit 200, for example. As still another example of presentation timing, the word/phrase storage unit 230 may store information showing timing at which the corresponding word/phrase registered in the word/phrase storage unit 230 is allowed to be presented to the operators 120, by using any of various predetermined time points as a standard.

FIG. 4 shows an example of the content of the operator information storage unit 260 according to this embodiment. The operator information storage unit 260 stores, for each of multiple operators: an "operator ID" that is identification information for identifying the operator; and a "highest risk index" indicating the highest secret degree of words/phrases in original data which are allowed to be presented to the operator.

For example, the operator 120a has an operator ID of "A" and a highest risk index of "high." Accordingly, the assisting apparatus 100 may present, to the operator 120a, sections of the original data including words/phrases each of which has a secret degree of "high" or lower.

The operator 120b has an operator ID of "B" and a highest risk index of "medium." Accordingly, to the operator 120b, the assisting apparatus 100 may present sections of the original data including words/phrases each of which has a secret degree of "medium" or lower, but cannot present sections thereof including words/phrases each of which has a secret degree of "high."

In this embodiment, classifications of the secret degree are "high," "medium" and "low." Alternatively, a secret degree may be that indicating the secret degree by using a numeral value, or may be that indicating whether or not the corresponding word/phrase should be kept secret by using a boolean value.

Figure 5:
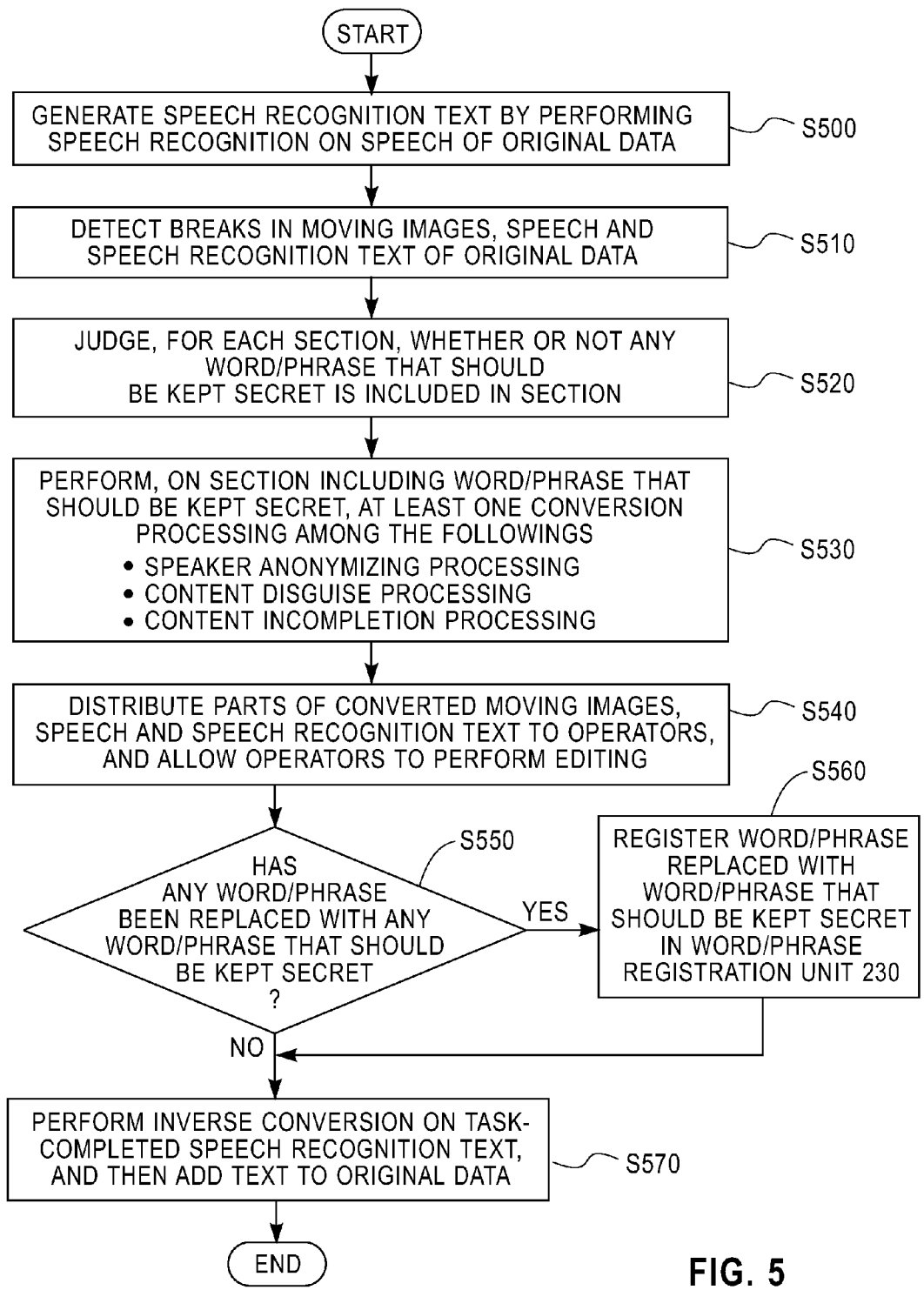
FIG. 5 shows an operation flow of the assisting apparatus 100 according to the embodiment of the present invention.

FIG. 5 shows an operation flow of the assisting apparatus 100 according to this embodiment. Firstly, the speech recognition unit 210 reads original data such as data on moving images with voice from the original data storage unit 200. Then, the speech recognition unit 210 recognizes the voice of the original data, and thereby generates a speech recognition text (Step S500).

Subsequently, the conversion unit 220 detects breaks in the moving images, the voice and the speech recognition text of the original data, on the basis of a predetermined unit such as topic, sentence, word/phrase and/or the like (S510). The conversion unit 220 may detect each sentence break and/or topic break under the condition that the length of a time-gap in which no utterance is made in the voice data satisfies a standard time-gap. Alternatively, the conversion unit 220 may detect each topic break under the condition that an utterance including a predetermined typical word/phrase for breaks, such as "Move on to the next news" or "The next is sport news," for example, is made. In stead of this, or in addition to this, the conversion unit 220 may increase the accuracy in detecting topic breaks, by judging whether a switching of images in which images change at predetermined standard change amount or larger is detected. Alternatively, the conversion unit 220 may detect each sentence break and/or word/phrase break by using a result of morpheme analysis in speech recognition.

Thereafter, the conversion unit 220 judges whether or not each section includes any word/phrase to be kept secret (S520). As an example, the conversion unit 220 detects whether or not the speech recognition text includes any word/phrase that matches any of registered words/phrases stored in the word/phrase storage unit 230, and/or whether or not the speech recognition text includes any word/phrase similar to any of the registered words/phrases at a degree equal to or higher than a predetermined evaluation value.

Then, if the speech recognition text includes a word/phrase that matches any of the registered words/phrases, the conversion unit 220 assigns a secret degree indicated by a risk index associated with the registered word/phrase, to the corresponding section of the speech recognition text. If two or more registered words/phrases are included in a section, the conversion unit 220 assigns the section the highest risk index among the risk indices corresponding to the two or more registered words/phrases. The conversion unit 220 may determine, for each of the registered words/phrases, a target of secure processing from among the entire topic, each sentence, each clause, each word/phrase and/or the like including the registered word/phrase, according to the preset risk measures stored in the word/phrase storage unit 230 in association with the registered word/phrase.

Next, the conversion unit 220 performs secure processing such as the content disguise processing or the content incompletion processing on the moving images, voice and speech recognition text of each section including a word/phrase that should be kept secret (S530). Moreover, the equalization unit 240 performs the speaker anonymizing processing on the voice of the converted data outputted by the conversion unit 220. Here, the conversion unit 220 and the equalization unit 240 may keep sections that do not include any word/phrase to be kept secret, as they are in the original data, without performing secure processing on the sections, so that the operators 120 would be able to perform a subtitle creation task on the sections including nothing kept secret.

Subsequently, the interface unit 250 provides the one or multiple operators 120 with the converted data including moving images and voice converted by the conversion unit 220 and the equalization unit 240, and the speech recognition text of the converted data, and thereby allows the one or multiple operators 120 to edit the speech recognition text of the converted data and create subtitles corresponding to the voice of the converted data (S540). When the task is to be shared by the multiple operators 120, the interface unit 250 distributes multiple divided data obtained by dividing the converted data, respectively to the multiple operators 120a to 120c, and thereby allows each of the multiple operators 120 to perform the task on the basis of the corresponding distributed divided data. Then, the interface unit 250 puts multiple task-completed divided data together, and thereby generates task-completed converted data.

Thereafter, the word/phrase registration unit 270 searches the task-completed speech recognition text to detect whether the speech recognition text includes any word/phrase replaced with any of the registered words/phrases stored in the word/phrase storage unit 230 (S550). If at least one of the operators 120 has replaced, through the interface unit 250, a word/phrase in the speech recognition text of the converted data with any of the registered words/phrases that should be kept secret, the word/phrase registration unit 270 registers, in the word/phrase storage unit 230, the word/phrase before replacement as a word/phrase that should be kept secret (S560). In this way, even when the same misrecognition occurs in later speech recognition, the word/phrase registration unit 270 can identify the misrecognized word/phrase as a risk word/phrase that should be kept secret.

The inverse conversion unit 280 performs inverse conversion on the task-completed speech recognition text, and thereby generates text data for subtitles. Then, the inverse conversion unit 280 adds the generated text data for subtitles to a corresponding part of the original data of the moving images with voice (S570).

By using the above-described assisting apparatus 100, converted data and a speech recognition text of the converted data are generated on the basis of data on moving images with voice as original data, so that the operators can perform a subtitle editing task in the state where the content of the original data are kept secret from the operators. Moreover, the assisting apparatus 100 enables generation of moving images with voice including subtitles added thereto while the content are kept secret from the operators, by adding an edited text data for subtitles to the original data of the moving images with voice.

The assisting apparatus 100 may perform secure processing on the entire original data without judging, for each of the sections, whether or not any word/phrase that should be kept secret is included in the section. In this case, there is a possibility that the burden of a task would be heavy, since the secure processing is performed even on a topic that does not need to be kept secret from the operators, such as "flowering of cherry trees," for example. On the other hand, the assisting apparatus 100 impartially performs the secure processing even when a topic or the like to be kept secret does not include any of the registered words/phrases in the word/phrase storage unit 230, which may increase security.

The conversion unit 220 and/or the interface unit 250 may be configured not to provide the operators with moving images corresponding to sections that should be kept secret in the original data. This makes it possible for the assisting apparatus 100 to protect the content of the original data at a higher secret degree.

Figure 6:
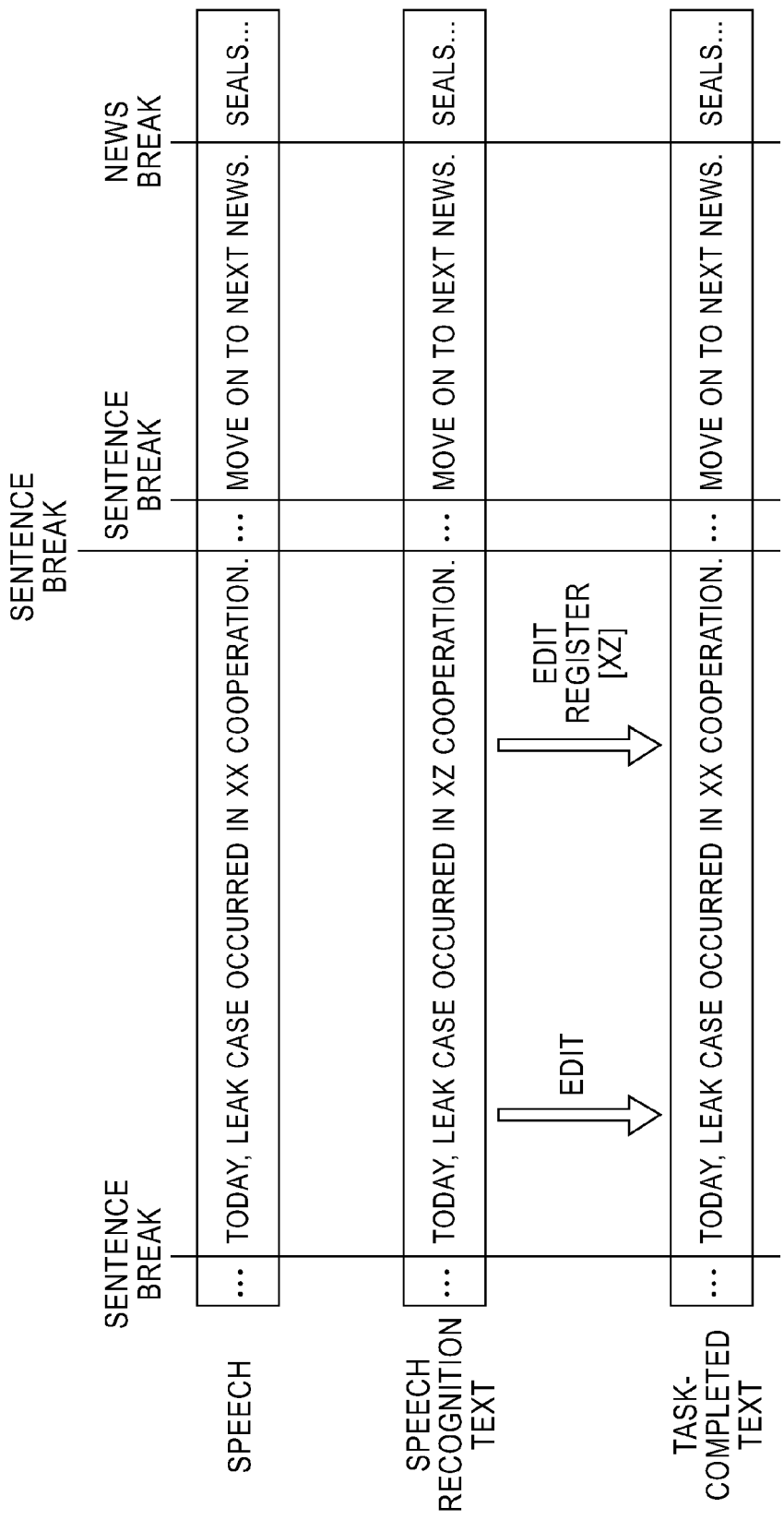
FIG. 6 shows an example of a subtitle editing task by the assisting apparatus 100 according to the embodiment of the present invention.

FIG. 6 shows an example of the subtitle editing task by the assisting apparatus 100 according to this embodiment. The speech recognition unit 210 generates a speech recognition text by recognizing the voice of the original data. The conversion unit 220 detects a topic break for each item of news, a sentence break for each sentence, a word/phrase break for each word/phrase or the like in the speech recognition text. Here, as described above, the conversion unit 220 may detect each topic break on the basis of typical words/phrases for break or may detect each sentence break or the like on the basis of a result of morpheme analysis in speech recognition, as described above. Moreover, the conversion unit 220 may adjust each detected break by providing a feedback based on a result of an investigation on a time-gap of voice.

Then, the interface unit 250 provides the one or multiple operators 120 with the speech recognition text of the converted data subjected to the secure processing by the conversion unit 220 and the equalization unit 240. Each operator 120 edits and modifies the speech recognition text with reference to the moving images, the voice and the speech recognition text of the converted data. As a result, the interface unit 250 can obtain modified task-completed text. In FIG. 6, an example of not performing any secure processing on the speech recognition text is presented for simplicity of explanation. In the example in FIG. 6, the operator 120 modifies the misrecognized "XZ" to "XX" and "leek case" to "leak case."

Here, if "XX" is registered as a risk word/phrase in the word/phrase storage unit 230, the word/phrase registration unit 270 registers "XZ," which has been replaced with "XX" by the operator, in the word/phrase storage unit 230. The word/phrase registration unit 270 may also assign "XZ" the risk index, the time limit for processing and the risk measures that are the same as those assigned to "XX." Thereby, if "XX" is misrecognized as "XZ" in later speech recognition, the assisting apparatus 100 can also recognize "XZ" as a risk word/phrase, and is thus capable of performing appropriate secure processing.

Figure 7:
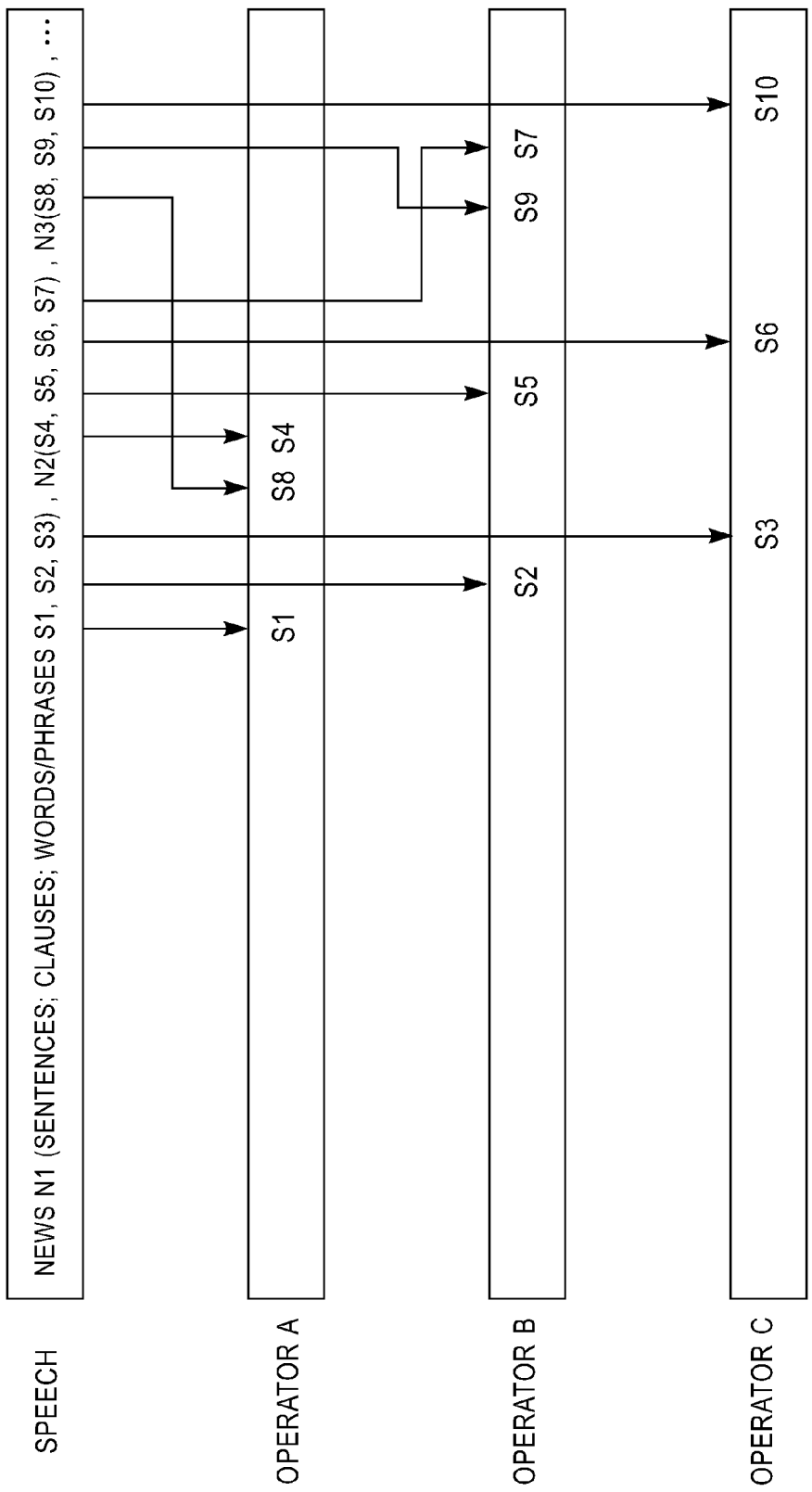
FIG. 7 shows a first example of conversion processing by the assisting apparatus 100 according to the embodiment of the present invention.

FIG. 7 shows the content incompletion processing as a first example of conversion processing performed by the assisting apparatus 100 according to this embodiment. In FIG. 7, original data includes, in the following order: news N1 including sections S1 to S3 in this order; news N2 including sections S4 to S7 in this order; and news N3 including sections S8 to S10 in this order. Here, the sections include sentences, clauses, words/phrases and/or the like.

In the content incompletion processing, the conversion unit 220 generates converted data by rearranging sections of the moving images, the voice and the speech recognition text of the original data, separately. In the example in FIG. 7, the conversion unit 220 generates converted data and speech recognition text by moving the section S8 of the news N3 to the preceding position of the section S4 of the news N2, and the section S7 of the news N2 to the subsequent position of the section S9 of the news N3.

Here, the conversion unit 220 may distribute words/phrases that should be kept secret, in the original data and the speech recognition text of the original data. Specifically, the conversion unit 220 arranges the risk words/phrases included in the sections, in the original data and the speech recognition text of the original data in a distributed manner so that the distribution of the secret degrees of the respective sections calculated on the basis of the risk words/phrases included in each section would be equalized.

Furthermore, the interface unit 250 divides the generated converted data and speech recognition text, and provides the multiple divided data respectively to the multiple operators 120. In the example in FIG. 7, the interface unit 250 distributes sections of the converted data subjected to the content incompletion processing to the multiple operators 120 in a substantially interleaving manner: the section S1 of the news N1 to the operator 120*a*; the section S2 to the operator 120*b*; the section S3 to the operator 120*c*; the section S8 of the news N3 moved by rearrangement and the section S4 of the news N2 to the operator 120*a*; and the like. In this way, the interface unit 250 can make it further difficult for the operators 120 having received a part of the converted data to know the content of the original data, by distributing the sections of the converted data to the multiple operators 120.

Here, the interface unit 250 may select the operators 120*a* to 120*c* to be provided with divided data, on the basis of the secret degrees of the words/phrases included in the divided data. If the secret degree of the section S4 of the news N2 is "high," the interface unit 250 may distribute the section S4 to the operator 120*a* or the like who can satisfy the secret degree condition as illustrated in FIG. 7, instead of the operator 120*b* having a highest risk index of "medium."

The interface unit 250 searches the converted data and the speech recognition text of the converted data for each section including any registered word/phrase associated with presentation timing, and then presents the searched-out section to the operators 120 at the timing satisfying the presentation timing. To make this possible, the interface unit 250 may delay the timing at which each rearranged section is presented to the operators 120, in accordance with the presentation timing for the section. Alternatively, the interface unit 250 may rearrange multiple sections so that the presentation timings of the sections would be satisfied. For example, the interface unit 250 may move a section on which no presentation timing limitation is imposed and a section having presentation timing allowing earlier presentation, further up in the arrangement, and may move a section having presentation timing requiring later presentation, further down in the arrangement. In these cases, the interface unit 250 performs rearrangement operation so that the presentation timings of all the sections would be satisfied.

By the processing illustrated above, the assisting apparatus 100 can distribute, to the operators, parts of converted data including the content of multiple topics. Thus, the assisting apparatus 100 is capable of preventing the content of the original data from being leaked. In the above-described processing, the conversion unit 220 may not only rearrange the order of sections of each of the original data and the speech recognition text, but also change a time-gap between each two rearranged sections in accordance with the secret degrees of the sections.

If the above-described rearrangement is performed, the conversion unit 220 may generate, for example, a correspondence table showing a relationship between the position of each section in the original data before conversion and the position to which the section is moved in the converted data, and then transfer the generated correspondence table to the inverse conversion unit 280 through the equalization unit 240 and the interface unit 250. Thereby, the inverse conversion unit 280 can arrange the order of the sections in the converted data back to the order in the original data with reference to the correspondence table.

Figure 8:
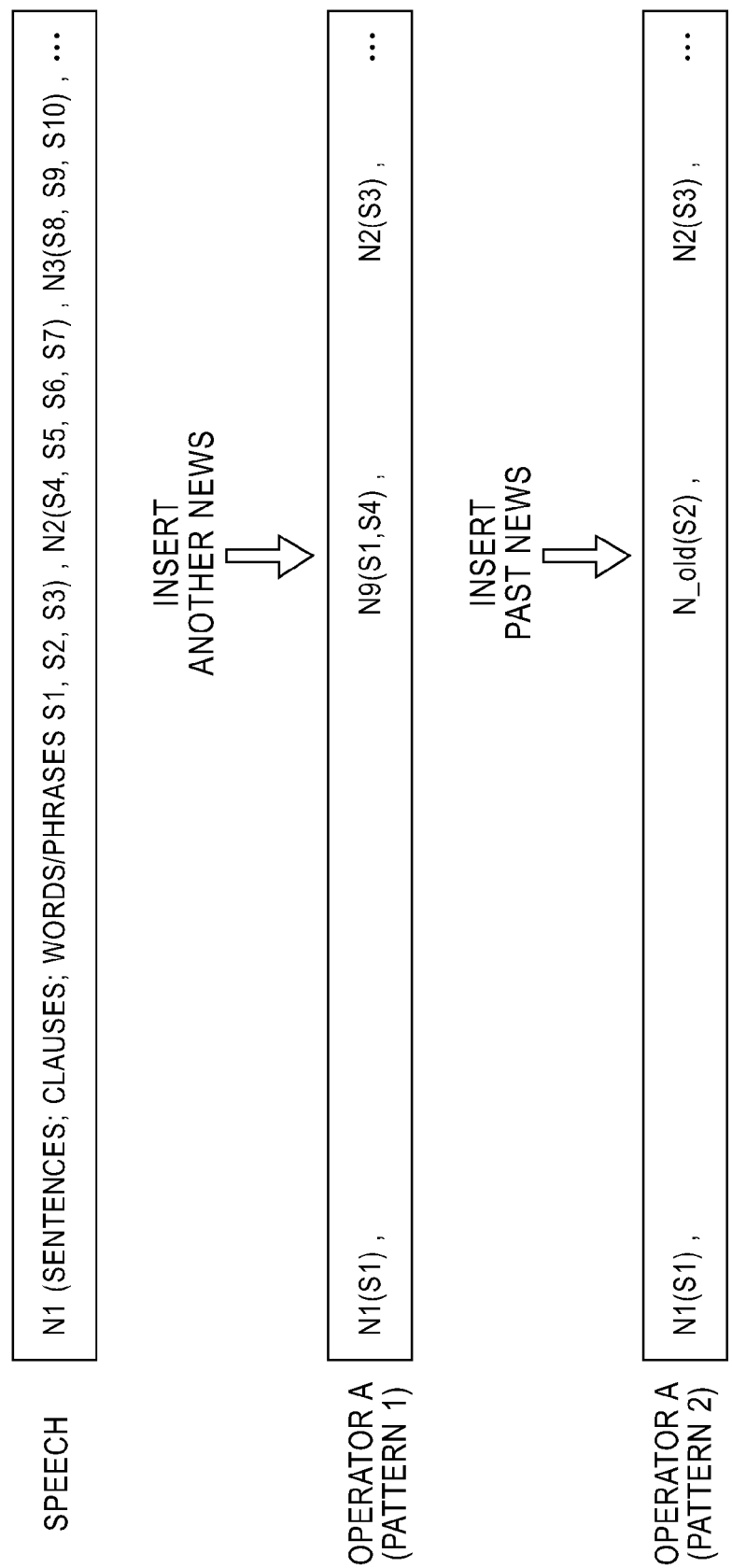
FIG. 8 shows a second example of the conversion processing by the assisting apparatus 100 according to the embodiment of the present invention.

FIG. 8 shows the content disguise processing as a second example of the conversion processing performed by the assisting apparatus 100 according to this embodiment. In FIG. 8, the original data includes, in the following order: the news N1 including the sections S1 to S3 in this order; the news N2 including the sections S4 to S7 in this order; and the news N3 including the sections S8 to S10 in this order. Here, the sections include sentences, clauses, words/phrases and/or the like. For the simplicity of explanation, the content disguise processing performed on converted data provided to the operator 120*a* is illustrated in FIG. 8.

In the content disguise processing, the conversion unit 220 inserts a different moving image, voice or text into at least one corresponding section of each of the moving images, voice and speech recognition text of the original data. A pattern 1 in FIG. 8 shows an example of inserting data of a different item of news into a position between two items of news of the original data. A pattern 2 in FIG. 8 shows an example of inserting data of a different item of news to which subtitles are already added, into a position between two items of news of the original data. In the latter case, the conversion unit 220 may read the data on the different item of news already including subtitles, from the task-completed data storage unit 290, and then add the data between the items of news of the original data in processing after removing the subtitle text.

As described above, the conversion unit 220 inserts a different topic, sentence, clause and/or word/phrase into a position between topics, sentences, clauses and/or words/phrases of the original data. Thereby, the conversion unit 220 makes it impossible to find out the topics, sentences, clauses and/or words/phrases belonging to the original data, and is thus capable of keeping the content of the original data secret. Furthermore, the conversion unit 220 may make it further difficult to specify the content of the original data by inserting different voice, speech recognition text and the like into the voice, speech recognition text and the like of the original data through the content disguise processing and then rearranging sections of each of the voice, speech recognition text and the like through the content incompletion processing.

In the above event, when judging that the voice, speech recognition text and the like of the original data include a proper noun that should be kept secret from the operators 120, the conversion unit 220 may generate converted data and a speech recognition text of the converted data by inserting voice, text or the like of a different proper noun into at least one corresponding section of each of the voice, speech recognition text and the like of the original data. For example, if a company name is included in voice, speech recognition text and the like of original data, the conversion unit 220 may insert a different company name into the original data; if a person's name is included in original data, the conversion unit 220 may insert a different person's name into the original data; if a place name is included in original data, the conversion unit 220 may insert a different place name into the original data. Thereby, the conversion unit 220 can keep the content of the original data secret by making it impossible to identify a proper noun such as a company name, a person's name, a place name or the like included in news or the like.

Here, when different voice, text and the like are inserted into the voice, speech recognition text and the like of the original data, the conversion unit 220 may add information to the inserted voice, text and the like for distinguishing the inserted voice, text and the like from the voice, speech recognition text and the like of the original data. Thereby, the inverse conversion unit 280 can check sections to which the information is added and then delete the sections from the voice, the speech recognition text and the like of the converted data.

FIG. 9 shows an example of a hardware configuration of a computer 1900 according to this embodiment. The computer 1900 according to this embodiment includes: a CPU periphery including a CPU 2000, a RAM 2020, a graphics controller 2075 and a display 2080 connected to one another by a host controller 2082; an input/output unit including a communication interface 2030, a hard disk drive 2040 and a DVD drive 2060 connected to the host controller 2082 via an input/output controller 2084; and a legacy input/output unit including a ROM 2010, a flexible disk drive 2050 and an input/output chip 2070 connected to the input/output controller 2084.

The host controller 2082 connects the RAM 2020 to the CPU 2000 and the graphics controller 2075, which access the RAM 2020 at a high transfer rate. The CPU 2000 operates on the basis of programs stored in the ROM 2010 and the RAM 2020 to control various units. The graphics controller 2075 acquires image data generated in a frame buffer in the RAM 2020 by the CPU 2000 or the like, and then displays the image data on the display 2080. Alternatively, the graphics controller 2075 may include therein a frame buffer for storing image data generated by the CPU 2000 or the like.

The input/output controller 2084 connects the host controller 2082 to the communication interface 2030, the hard disk drive 2040 and the DVD drive 2060, which are relatively-high speed input/output devices. The communication interface 2030 communicates with a different apparatus through a network. The hard disk drive 2040 stores programs and data to be used by the CPU 2000 in the computer 1900. The DVD drive 2060 reads a program or data from a DVD 2095 and then provides the program or data to the hard disk drive 2040 through the RAM 2020.

To the input/output controller 2084, the ROM 2010, the flexible disk drive 2050 and the input/output chip 2070, which are relatively-low speed input/output devices, are connected.

The ROM 2010 stores a boot program executed by the computer 1900 at the time of booting, hardware-dependent programs of the computer 1900 and/or the like. The flexible disk drive 2050 reads a program or data from a flexible disk 2090 and then provides the read program or data to the hard disk drive 2040 through the RAM 2020. The input/output chip 2070 connects the flexible disk drive 2050 to the input/output controller 2084, and also connects various input/output devices to the input/output controller 2084 through a parallel port, a serial port, a keyboard port, a mouse port or the like, for example.

The programs provided to the hard disk drive 2040 through the RAM 2020 are stored, by a user, in a recording medium such as the flexible disk 2090, the DVD 2095, an IC card or the like. The program is read from the recording medium, installed in the hard disk drive 2040 in the computer 1900 through the RAM 2020, and then run by the CPU 2000.

The programs installed in the computer 1900 and thereby causing the computer 1900 to function as the assisting apparatus 100 include: an original data storage management module for managing the original data storage unit 200; a speech recognition module; a conversion module; a word/phrase storage management module for managing the word/phrase storage unit 230; an equalization module; an interface module; an operator information storage management module for managing the operator information storage unit 260; a word/phrase registration module; an inverse conversion module; and a task-completed data storage management module for managing the task-completed data storage unit 290. The CPU 2000 or the like operates according to the program and the modules to cause the computer 1900 to function as the original data storage unit 200, the speech recognition unit 210, the conversion unit 220, the word/phrase storage unit 230, the equalization unit 240, the interface unit 250, the operator information storage unit 260, the word/phrase registration unit 270, the inverse conversion unit 280 and the task-completed data storage unit 290.

Information processing written in the programs function, by being read by the computer 1900, as the speech recognition unit 210, the conversion unit 220, the equalization unit 240, the interface unit 250, the word/phrase registration unit 270 and the inverse conversion unit 280, which are concrete means configured in cooperation of software and the above-described various hardware sources. By these concrete means, information is calculated or processed for the intended use of the computer 1900 according to this embodiment, and thereby the specific assisting apparatus 100 according to the intended use is structured.

As an example, if communication is performed between the computer 1900 and an external apparatus or the like, the CPU 2000 executes a communication program loaded into the RAM 2020, and thereby instructs the communication interface 2030 to perform communication processing, on the basis of the processing content written in the communication program. Upon control by the CPU 2000, the communication interface 2030 reads transmission data stored in a transmission buffer area or the like provided in a storage such as the RAM 2020, the hard disk drive 2040, the flexible disk 2090 or the DVD 2095, and then transmits the read transmission data to the network, or writes reception data received from the network into a reception buffer area or the like provided in a storage. Thus, the communication interface 2030 may transmit and receive transmission/reception data to and from a storage by a DMA (direct memory access) system; alternatively, the CPU 2000 may transfer transmission/reception data by reading data from a transfer-source storage or the communication interface 2030 and then writing the data into the transfer-destination communication interface 2030 or storage.

The CPU 2000 loads, into the RAM 2020, the entire or a necessary part of a file, a database or the like stored in an external storage such as the hard disk drive 2040, the DVD drive 2060 (DVD 2095) or the flexible disk drive 2050 (flexible disk 2090), by DMA transfer or the like, and thereby performs various processing on the data in the RAM 2020. Thereafter, the CPU 2000 writes the data subjected to the processing back to the external storage by DMA transfer or the like. Since the RAM 2020 is regarded as one for temporarily holding the content of the external storage, the RAM 2020, the external storage and the like are collectively called a memory, a storage unit, a storage or the like in this embodiment. Various information pieces such as various programs, data, tables, databases and the like in this embodiment are stored in the above-described storage, and are to be subjected to information processing. Here, the CPU 2000 can also allow a cache memory to hold a part of data in the RAM 2020 and to thereby perform reading and writing on the data. Since the cache memory performs a part of the function of the RAM 2020 also in such a case, the cache memory is also considered to be included in the RAM 2020, the memory and/or the storage in this embodiment unless otherwise stated.

The CPU 2000 performs, on the data read from the RAM 2020, various processing, such as various calculations, information processing, condition judgments and information searches/replacements, which are described in this embodiment and specified by instruction sequences of the programs, and then writes the data subjected to the processing back to the RAM 2020. For example, in the case of performing a condition judgment, the CPU 2000 judges whether each of various variables shown in this embodiment satisfies a condition of being, for example, larger than, smaller than, not smaller than, not larger than or equal to another variable or a constant, and then takes a branch to a different instruction sequence or invokes a subroutine when the condition is satisfied (or is not satisfied).

The CPU 2000 can searches for information stored in the file, the database or the like in the storage. For example, when multiple entries each including an attribute value of a first attribute and an attribute value of a second attribute associated with each other are stored in the storage, the CPU 2000 searches the multiple entries stored in the storage, for an entry whose first attribute value satisfies a specified condition, reads the second attribute value stored in the entry, and thereby obtains the second attribute value associated with the first attribute value satisfying the predetermined condition.

The above-described programs or modules may be stored in an external recording medium. As the external recording medium, used can be an optical recording medium such as a DVD or a CD, a magneto-optical recording medium such as an MO, a tape medium, a semiconductor memory such as an IC card, and the like besides the flexible disk 2090 and the DVD 2095. Alternatively, the programs may be provided to the computer 1900 through the network by using a storage such as a hard disk or a RAM provided in a server system connected to a dedicated communication network or the Internet.

Hereinabove, the present invention has been described on the basis of the above-described embodiment. However, the technical scope of the present invention is not limited to the scope of the embodiment. It is apparent to those skilled in the art that various changes and improvements can be added to the above-described embodiment. In addition, it is apparent from the scope of the claims that embodiments including such changes and improvements are within the technical scope of the present invention.

Note that the order of processes such as operations, procedures, steps or stages in the apparatus, system, program or method described in the scope of claims, the description or the drawings is not especially specified by any expression such as "prior to" or "before," and that the processes can be performed in any order as long as an output of a process is not used in a subsequent process. Moreover, even if an expression such as "firstly" or "then" is used in an explanation of an operation flow in the scope of claims, the description or the drawings for the sake of convenience, this does not mean that the processes must be performed in the order.

Although the preferred embodiment of the present invention has been described in detail, it should be understood that various changes, substitutions and alternations can be made therein without departing from spirit and scope of the invention as defined by the appended claims.

What is claimed is:

1. An assisting apparatus that assists in a task for generating task-completed data from original data with audio or text, the assisting apparatus comprising:
    a conversion unit that converts the original data with audio or text into converted data with audio or text in order to keep a content of the original data secret from an operator in charge of the task;
    an interface unit that provides the converted data with audio or text to the operator, and thereby allows the operator to perform the task by using the converted data with audio or text and thus to generate a task-completed version of the converted data with audio or text, said operator generating a task-completed version of the converted data with text on the basis of the audio of the converted data; and
    an inverse conversion unit that generates the task-completed data with text by performing inverse conversion of the task-completed version of the converted data with text, and
    a speech recognition unit that generates a speech recognition text by recognizing audio of the original data, wherein
    the conversion unit converting the original data and a speech recognition text of the original data into the converted data and a speech recognition text of the converted data, and
    the interface unit providing the converted data and the speech recognition text of the converted data to the operator, thereby allowing the operator to edit the speech recognition text of the converted data and to generate a transcription corresponding to audio of the converted data,
    the conversion unit further generating the converted data and the speech recognition text of the converted data by inserting different audio and a different text into at least one section of the audio of the original data and at least one section of the speech recognition text of the original data, respectively,
    the inverse conversion unit generating the task-completed data by removing the sections corresponding to the different audio and text from the task-completed version of the converted data.

2. The assisting apparatus according to claim 1, wherein, when judging that a proper noun that should be kept secret from the operator is included in the audio and the speech recognition text of the original data, the conversion unit generates the converted data and the speech recognition text of the converted data by inserting audio of a different proper noun and a text of a different proper noun into at least one section of the audio of the original data and at least one section of the speech recognition text of the original data, respectively.

3. The assisting apparatus according to claim 1, wherein
    the conversion unit generates the converted data and the speech recognition text of the converted data by rearranging sections of each of the original data and the speech recognition text of the original data, and
    the inverse conversion unit generates the task-completed data by arranging sections of the task-completed version of the converted data back to the original order.

4. The assisting apparatus according to claim 3, further comprising a word/phrase storage unit that stores whether or not each of a plurality of words/phrases should be kept secret from the operator, wherein
    the conversion unit rearranges sections of each of the original data and the speech recognition text of the original data, and thereby disperses words/phrases that should be kept secret in the original data and the speech recognition text of the original data.

5. The assisting apparatus according to claim 4, further comprising a word/phrase registration unit that, if a particular word/phrase in the speech recognition text of the converted data is replaced by the operator with a word/phrase that should be kept secret through the interface unit, registers the particular word/phrase in the word/phrase storage unit as the word/phrase that should be kept secret.

6. The assisting apparatus according to claim 5, wherein
    the word/phrase storage unit stores, for each of the plurality of words/phrases, presentation timing at which the word/phrase is allowed to be presented to the operator, and
    the interface unit presents a section of the converted data and the speech recognition text of the converted data including the word/phrase associated with the presentation timing to the operator at timing satisfying the presentation timing.

7. The assisting apparatus according to claim 6, further comprising an equalization unit that equalizes at least one of pitch, strength and utterance speed of the audio of the converted data generated by the conversion unit.

8. The assisting apparatus according to claim 3, wherein the interface unit distributes a plurality of divided data to a plurality of the operators, the divided data obtained by dividing the converted data, allows each of the plurality of operators to perform the task by using the corresponding divided data, and thereby generates the task-completed version of the converted data by putting together a plurality of task-completed versions of the divided data.

9. The assisting apparatus according to claim 8, further comprising:
    a word/phrase storage unit that stores a secret degree of each of a plurality of words/phrases; and
    an operator information storage unit that stores, for each of the plurality of operators, a highest secret degree of words/phrases which are allowed to be presented to the operator, wherein,
    in accordance with the secret degree of a word/phrase included in each of the divided data, the interface unit selects one of the operators to whom the divided data is to be provided.

10. The assisting apparatus according to claim 1, further comprising:
a word/phrase storage unit that stores, in association with each of a plurality of words/phrases, presentation timing at which the word/phrase is allowed to be presented to an operator;
said interface unit presenting a section of the original data including any of the words/phrases stored in the word/phrase storage unit, to the operator at timing satisfying the presentation timing corresponding to the word/phrase, and thereby allows the operator to perform the task on the section in the original data.

11. A computer implemented method for assisting in a task for generating task-completed data from original data, the assisting method comprising the steps of:
converting the original data with audio or text into converted data with audio or text in order to keep a content of the original data secret from an operator in charge of the task;
providing the converted data with audio or text to the operator, to allow the operator to perform the task by using the converted data with audio or text and thus to generate a task-completed version of the converted data with audio or text, said operator generating a task-completed version of the converted data with text on the basis of the audio of the converted data; and
generating the task-completed data with text by performing inverse conversion of the task-completed version of the converted data with text, and
generating a speech recognition text by recognizing audio of the original data, wherein
said converting the original data includes converting speech recognition text of the original data into the converted data and a speech recognition text of the converted data, and
said providing including providing the converted data and the speech recognition text of the converted data to the operator, thereby allowing the operator to edit the speech recognition text of the converted data and to generate a transcription corresponding to audio of the converted data, and,
further generating the converted data and the speech recognition text of the converted data by inserting different audio and a different text into at least one section of the audio of the original data and at least one section of the speech recognition text of the original data, respectively, and
generating the task-completed data by removing the sections corresponding to the different audio and text from the task-completed version of the converted data.

12. A storage medium tangibly embodying therein or thereon computer executable instructions which, when executed, will cause a computer to function as an assisting apparatus and perform a method for assisting in a task for generating task-completed data from original data, said method comprising:
converting the original data with audio or text into converted data with audio or text in order to keep a content of the original data secret from an operator in charge of the task;
providing the converted data with audio or text to the operator, to allow the operator to perform the task by using the converted data with audio or text and thus to generate a task-completed version of the converted data with audio or text, said operator generating a task-completed version of the converted data with text on the basis of the audio of the converted data and
generating the task-completed data with text by performing inverse conversion of the task-completed version of the converted data with text, and
generating a speech recognition text by recognizing audio of the original data, wherein
said converting the original data includes converting speech recognition text of the original data into the converted data and a speech recognition text of the converted data, and
said providing including providing the converted data and the speech recognition text of the converted data to the operator, thereby allowing the operator to edit the speech recognition text of the converted data and to generate a transcription corresponding to audio of the converted data, and,
further generating the converted data and the speech recognition text of the converted data by inserting different audio and a different text into at least one section of the audio of the original data and at least one section of the speech recognition text of the original data, respectively, and
generating the task-completed data by removing the sections corresponding to the different audio and text from the task-completed version of the converted data.

13. An assisting apparatus for assisting in a task for generating, from original data of a moving image with audio including an image and audio, task-completed data including a transcribed text added to the moving image with audio, the assisting apparatus comprising:
a speech recognition unit that generates a speech recognition text by recognizing audio of the original data;
a conversion unit that converts the original data and the speech recognition text of the original data into converted data and a speech recognition text of the converted data in order to keep a content of the original data secret from an operator in charge of the task;
an equalization unit that equalizes at least one of pitch, strength and utterance speed of audio of the converted data generated by the conversion unit;
an interface unit that provides the converted data and the speech recognition text of the converted data to the operator, and thereby allows the operator to edit the speech recognition text of the converted data and thus to generate a task-completed version of the converted data including a transcribed text corresponding to the audio; and
an inverse conversion unit that generates the task-completed data by performing inverse conversion of the task-completed version of the converted data, wherein
the conversion unit generates the converted data and the speech recognition text of the converted data by inserting audio of a different proper noun and a text of a different proper noun into at least one section of the audio of the original data and at least one section of the speech recognition text of the original data, respectively, and also by rearranging sections of each of the original data and the speech recognition text of the original data, and
the inverse conversion unit generates the task-completed data by arranging sections of the task-completed version of the converted data back to the original order and also by removing the sections corresponding to the different audio and text from the task-completed version of the converted data.

* * * * *